United States Patent [19]

Bott

[11] 4,303,367

[45] Dec. 1, 1981

[54] AUTOMOBILE SHOPPING BAG CONTAINER

[76] Inventor: John A. Bott, 931 Lake Shore Dr., Grosse Pointe Shores, Mich. 48236

[21] Appl. No.: 39,392

[22] Filed: May 15, 1979

[51] Int. Cl.³ .................................................. B60R 9/06
[52] U.S. Cl. ...................................... 414/522; 220/22; 224/281; 224/282; 410/68; 410/92; 410/156
[58] Field of Search ................ 414/462, 522; 224/42.43, 42.44, 281, 282, 314, 319, 321; 296/26; 280/47.35, 79.1 R; 220/20–22, 1.5; 410/52, 66–68, 77, 78, 90, 91, 92, 156

[56] References Cited

U.S. PATENT DOCUMENTS

| | | | |
|---|---|---|---|
| 2,554,086 | 5/1951 | Block | 220/22 X |
| 2,568,628 | 9/1951 | Herring | 224/42.44 X |
| 2,576,385 | 11/1951 | Bigsby | 414/522 X |
| 2,797,828 | 7/1957 | Fritsche | 414/522 |
| 3,004,678 | 10/1961 | Golaski | 414/462 |
| 3,132,755 | 5/1964 | Greenslate | 414/462 X |
| 3,439,790 | 4/1969 | Langley et al. | 193/35 SS |

Primary Examiner—Robert G. Sheridan
Attorney, Agent, or Firm—Harness, Dickey & Pierce

[57] ABSTRACT

A container having a plurality of open-topped receptacles for supporting loaded shopping bags in an upright position. The container is particularly adapted for supporting loaded shopping bags during transportation thereof in a vehicle and comprises: a box which is movable between a first position and a second position and which has open-topped receptacles, each one of which is adapted to receive and support a loaded shopping bag in an upright position; and means for supporting the box between the first and second positions in a vehicle.

9 Claims, 15 Drawing Figures

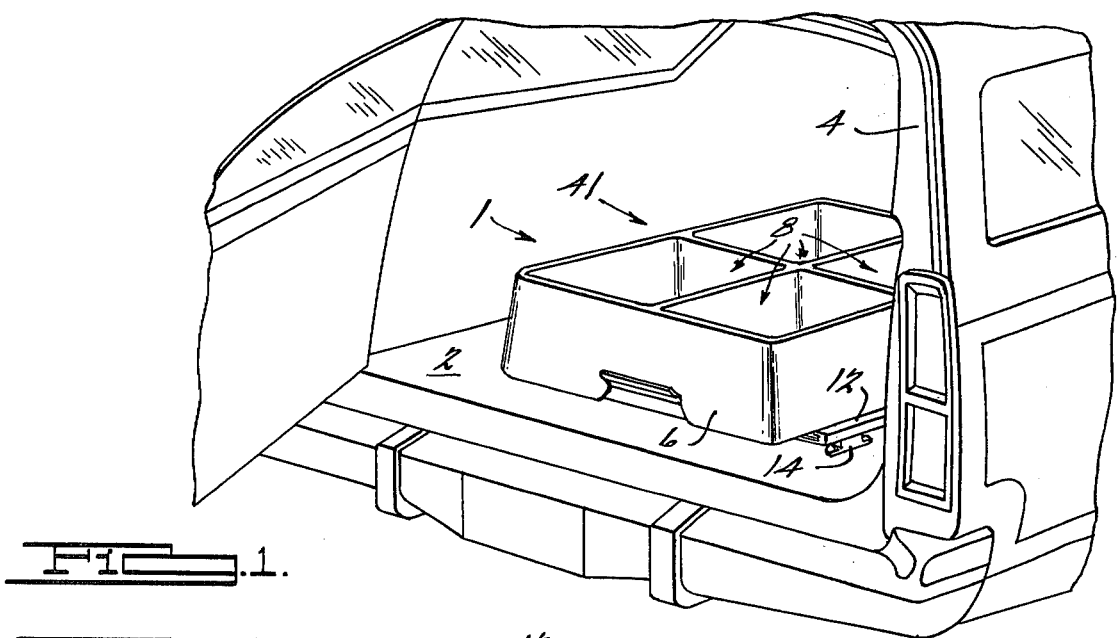
FIG. 1.
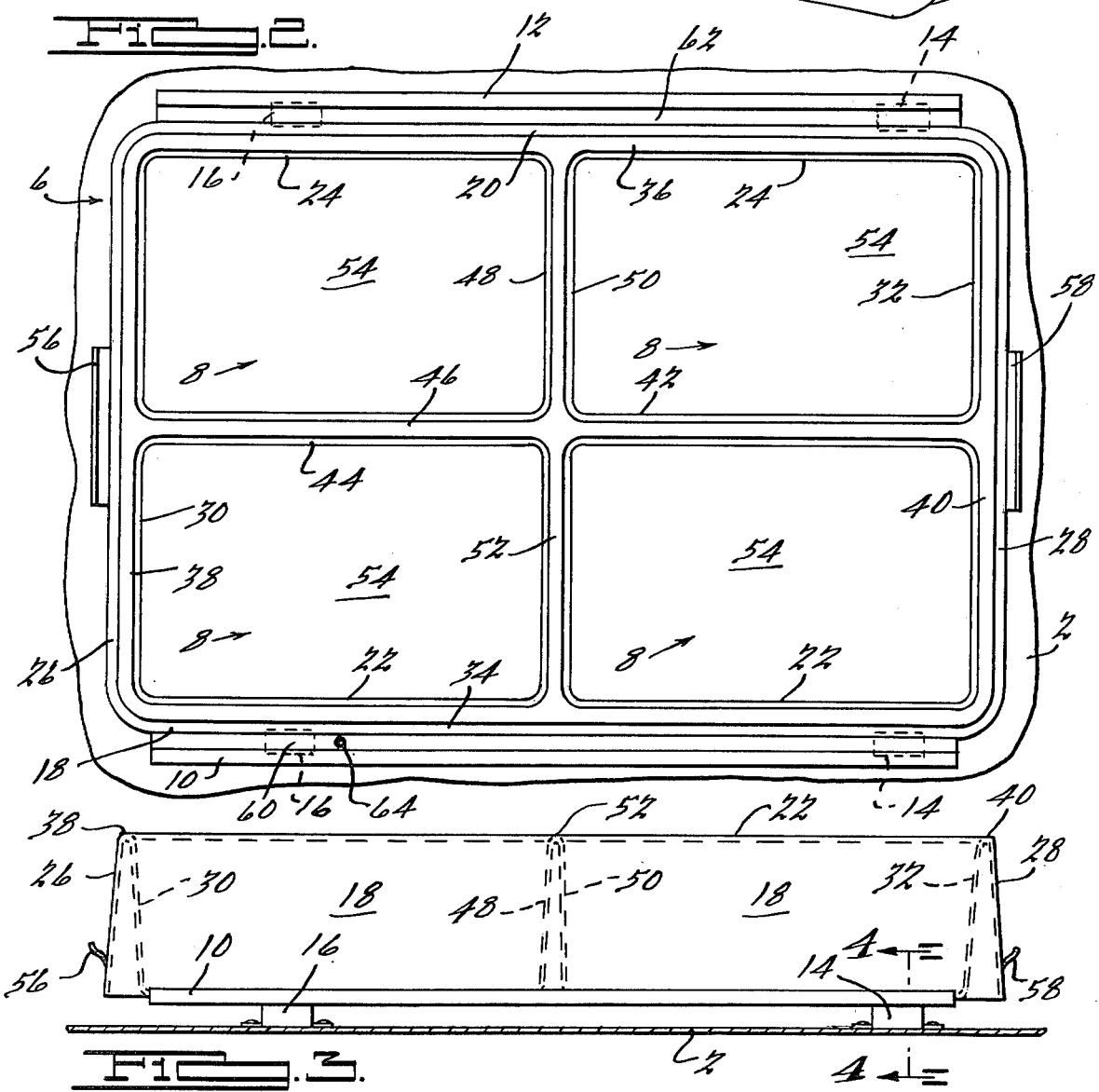
FIG. 2.
FIG. 3.

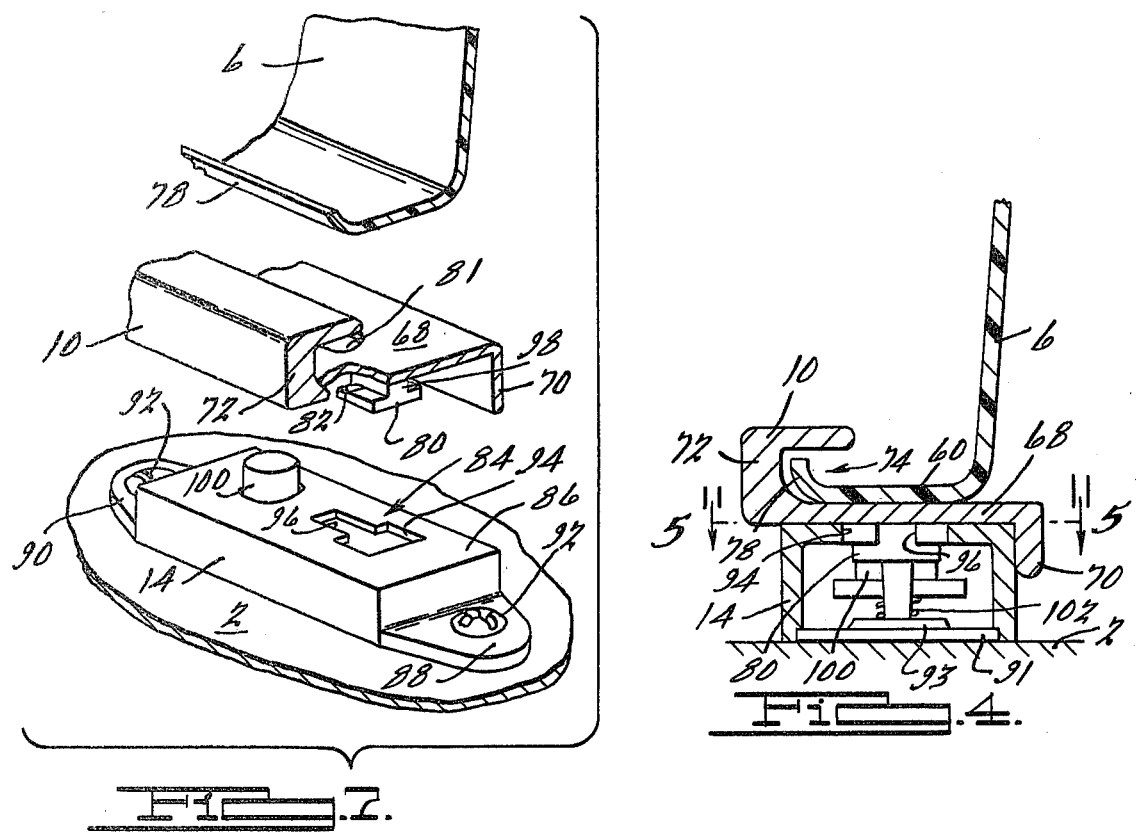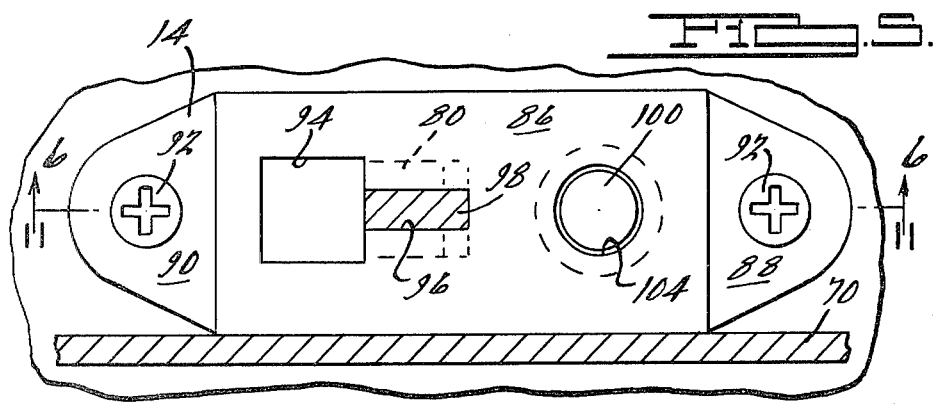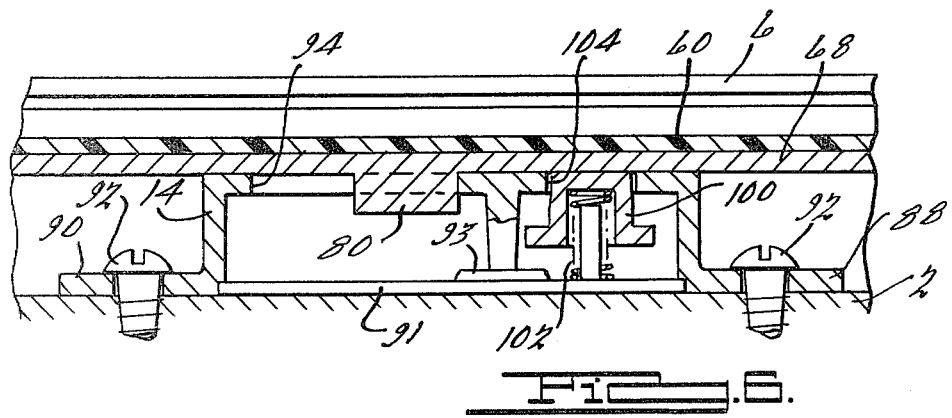

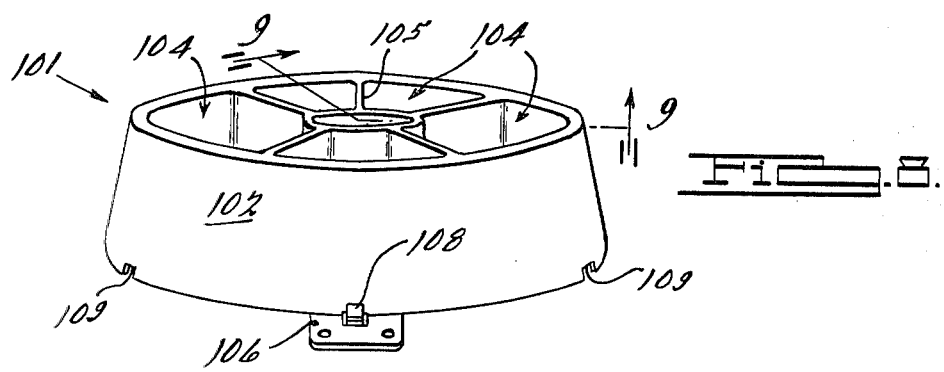
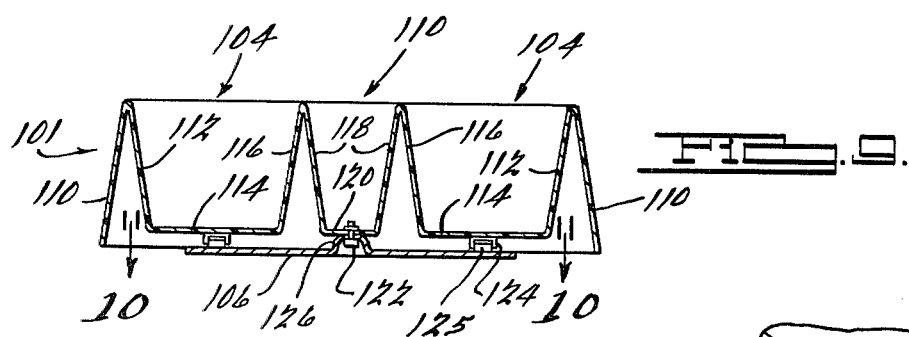
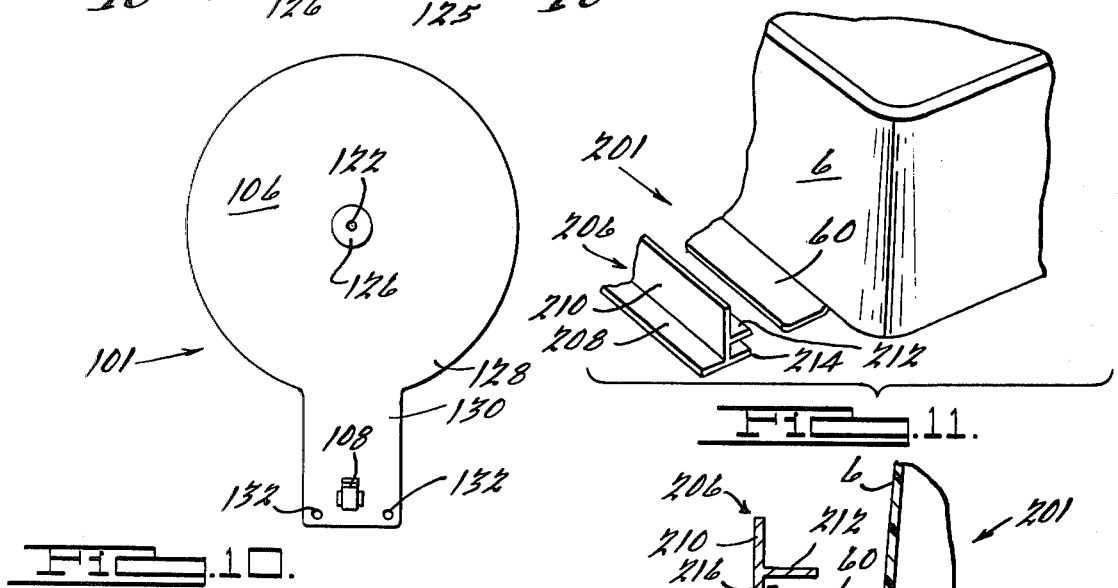
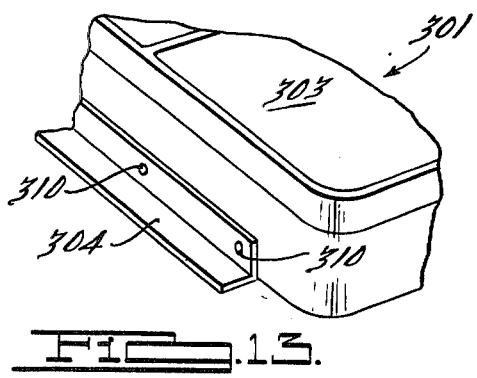
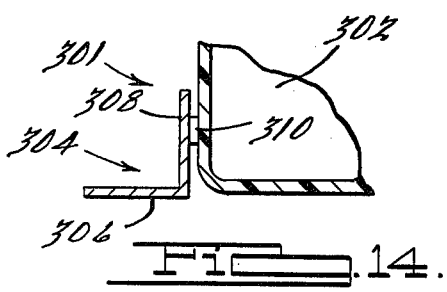

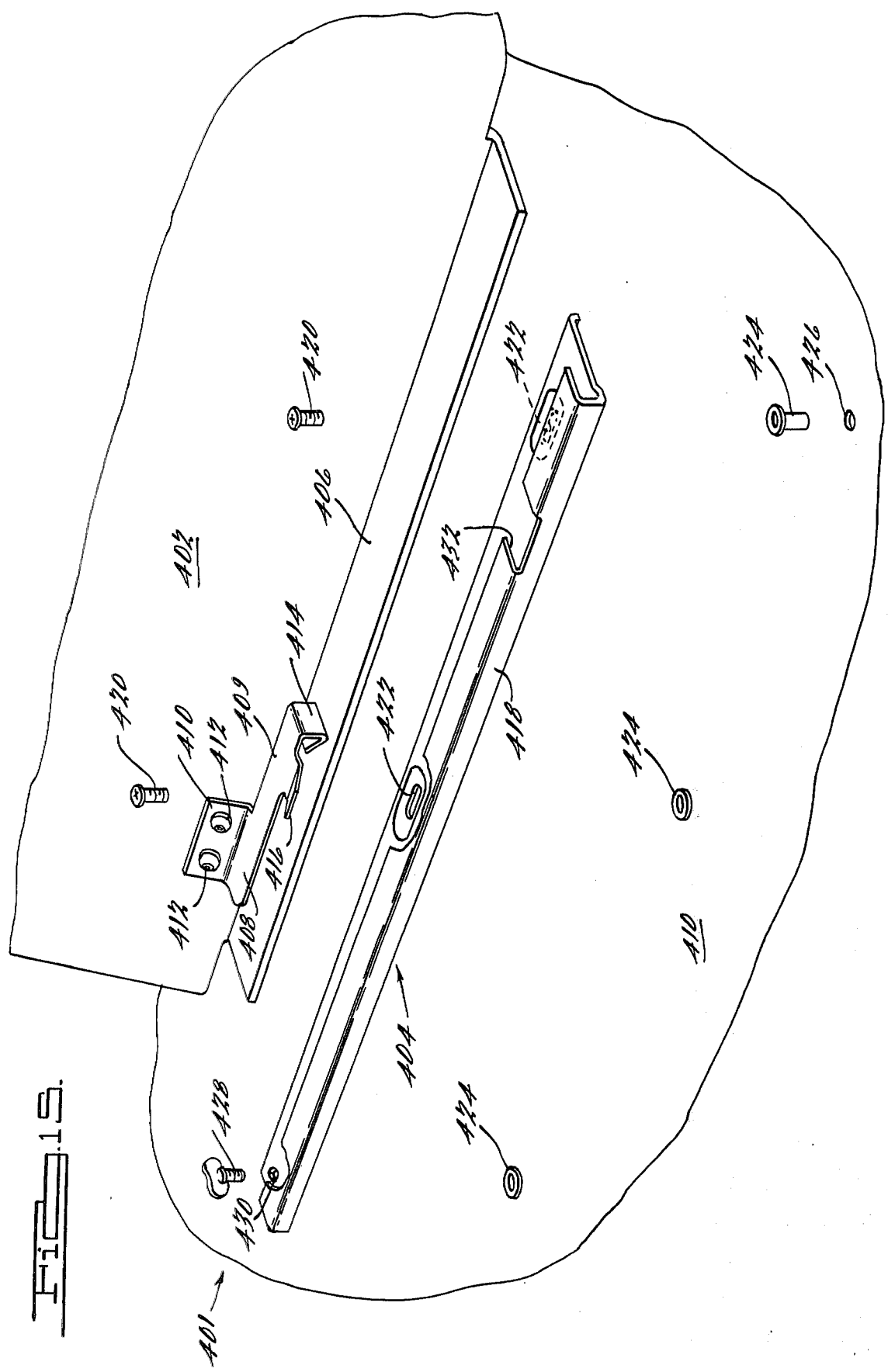

AUTOMOBILE SHOPPING BAG CONTAINER

BACKGROUND OF THE INVENTION

The present invention relates to a container which facilitates the transportation of loaded grocery or shopping bags in a vehicle station wagon, hatchback, van, and the like. More particularly, the present invention relates to a shopping bag holder or container intended to be attached to a vehicle and having a plurality of open topped receptacles, each receptacle being adapted to receive and support a shopping bag in an upright position during transportation thereof in the associated vehicle. In accordance with the present invention, the container is movable between a first position and a second position to facilitate the loading and unloading of each shopping bag into and from the container.

The problems associated with loading, transporting, and unloading grocery or shopping bags after a visit to a supermarket or other store are well known to most consumers. Of course, each grocery or shopping bag must be maintained in an upright position so that the contents do not spill onto the floor of the vehicle, or worse yet, onto the ground. Where a plurality of bags are involved, it is often difficult to place each bag in the vehicle in such a location that another bag can be placed therein. Often, earlier placed bags must be pushed to make room for later placed bags, resulting all to frequently in tearing or toppling of the earlier placed bags.

These problems are well known in the art and various devices have been proposed in the past for use in transporting loaded grocery bags. For example, U.S. Pat. Nos. 4,029,244 and 3,404,818 disclose collapsible or foldable devices for use in transporting loaded grocery bags. In addition, other carrying devices have been proposed for more general use, including luggage or package carriers for automobile trunks on the rear cargo area of station wagons such as those shown in U.S. Pat. Nos. 2,091,069; 2,554,776; 2,953,287; 2,986,315; 3,132,781; and 3,375,959.

Wherefore it is an object of the present invention to provide an improved device for holding shopping bags in an upright position during the transportation thereof in a vehicle. Another object of the present invention is to provide a container having a plurality of receptacles, each of which is adapted to support a grocery bag in an upright position in the interior portion of a vehicle wherein the container is selectively movable with respect to the vehicle so that ready access to each receptacle can be had. Still another object of the present invention is to provide a container which can be selectively attached or detached and removed from an associated vehicle. Yet another object of the present invention is to provide a container which can be easily and economically manufactured from modern materials and installed on an associated vehicle. These and other objects, features, and advantages of the present invention will be readily apparent from the following disclosure and appended claims taken in conjunction with the accompanying drawings.

BRIEF DESCRIPTION OF THE DRAWINGS

FIG. 1 is a perspective view, broken away, of a shopping bag container of the present invention shown mounted in the rear cargo area of a station wagon;

FIG. 2 is a plan view of the container of FIG. 1 mounted on a floor, shown broken away;

FIG. 3 is a side elevational view of the container of FIG. 2 mounted on a floor, shown broken away;

FIG. 4 is a sectional view taken along line 4—4 in FIG. 3;

FIG. 5 is a sectional view taken along line 5—5 in FIG. 4;

FIG. 6 is a sectional view taken along line 6—6 in FIG. 5;

FIG. 7 is an exploded view, in perspective, of an adaptor assembly, rail, and container flange broken away, of the container of FIG. 2;

FIG. 8 is a perspective view of an alternative embodiment of a shopping bag container of the present invention;

FIG. 9 is a sectional view taken along line 9—9 in FIG. 8;

FIG. 10 is a sectional view taken along line 10—10 in FIG. 9;

FIG. 11 is a perspective view, broken away, illustrating an alternative rail and container flange for use in the present invention;

FIG. 12 is a cross-sectional view, broken away, of the rail and container flange shown in FIG. 11;

FIG. 13 is a perspective view, broken away, showing another alternative rail and container for use in the present invention;

FIG. 14 is a cross-sectional view, broken away, of the rail and container of FIG. 13; and FIG. 15 is an exploded view, in perspective, of another alternative rail and container flange for use in the present invention.

DESCRIPTION OF THE INVENTION

The present invention relates to a container which is particularly well adapted for loading, transporting and unloading grocery or shopping bags and the like in a vehicle. A container of the present invention can be used with practically any vehicle having a horizontal floor of sufficient size to permit the installation of the container. However, it is contemplated that containers of this invention will be primarily used in conventional wheeled vehicles such as automobiles or vans, in particular station wagons, hatchbacks and the like. Of course, while containers of the present invention are designed for use with loaded shopping bags, the containers may be used to transport other materials and such other uses are contemplated to be within the broad scope of the present invention. In accordance with the intended use of the present invention, as used herein the terms "forward," "rearward," "left," and "right" are intended to be with respect to an associated vehicle as viewed by a driver thereof.

A shopping bag container of the present invention generally comprises a box having a plurality of open-topped receptacles, each adapted to support a shopping bag in an upright position, said box being movable between a first position and a second position, and means for supporting said box on a vehicle between said first and second positions.

Now referring to the FIGS. 1-7, a preferred embodiment of the present invention is shown and indicated generally by the numeral 1. In FIG. 1, shopping bag container 1 is shown in operative association with a vehicle of the station wagon type and is shown attached to floor 2 of station wagon 4. Shopping bag container 1 generally comprises box 6 which has a plurality of open-topped receptacles 8, and which is slideably supported by rails 10 and 12, each of which is removably attached to floor 2 of station wagon 4 by means of adaptor assemblies 14 and 16.

Box 6 is shown as having a generally rectangular outer configuration with four upwardly open receptacles 8, each suitably sized to receive and provide lateral support for a loaded grocery or shopping bag. It will, of course, be appreciated that box 6 can have more, or less than four receptacles 8, e.g. six or eight receptacles 8 could be provided. In the particular embodiment of FIGS. 1–7, box 6 is of molded plastic construction and has a double wall construction having longitudinally extending, outer side walls 18 and 20, longitudinally extending inner side walls 22 and 24, laterally extending outer side walls 26 and 28, and laterally extending inner side walls 30 and 32. The tops of pairs of proximate side walls 18 and 22, 20 and 24, 26 and 30, and 28 and 32 are respectively integrally joined by webs 34, 36, 38 and 40. The interior portion 41 of box 6 is divided into four compartments or receptacles 8 by longitudinal walls 42 and 44 which are proximate to each other and integrally joined by top web 46 and lateral walls 48 and 50 which are proximate to each other and integrally joined by top web 52. Each receptacle 8 has a bottom 54 which integrally joins the bottoms of the walls defining the particular receptacle. It will be appreciated that each pair of walls joined by a web portion are canted slightly with respect to each other to facilitate molding of box 6 from thermoplastic material and that box 6 is of integral construction. End walls 26 and 28 can have integral handles 56 and 58 to facilitate manipulation of box 6. Alternatively, separate handles could be attached. Less preferably no handles are employed and box 6 is manipulated by grasping the top portion thereof. Extending laterally outwardly from the bottom portion and for the entire length of outer side walls 18 and 20 respectively are flanges 60 and 62. Flanges 60 and 62 are adapted to slidably support box 6 on rails 10 and 12. Aperture 64 is provided in flange 60 to cooperate with an adaptor assembly 14 to provide means for limiting rearward sliding movement of box 6 with respect to rail 10 and, hence, also rail 12.

Rails 10 and 12 are of like symmetrical construction, rail 10 being adapted for use on the left side of box 6 while rail 12 is adapted for use on the right side of box 6. It will thus be understood that the following description of rail 10 is also applicable to rail 12. Rail 10 is of longitudinally elongated configuration and, as best shown in FIG. 4, has a horizontally disposed portion 68 which has a downwardly extending flange 70 and an inwardly facing channel portion 72 integrally formed on the laterally outer edge portion of rail 10. Channel portion 72 defines inwardly facing channel 74 which is adapted to slideably receive the laterally outer edge portion 78 of flange 60 which may be upturned, as best shown in FIG. 4, to minimize upward movement of flange 60. Flange 60 slideably rests upon horizontally disposed portion 68 of rail 10.

Rails 10 and 12 are parallel and spaced a distance apart such that lateral movement of flanges 60 and 62 is limited so that edge portion 78 is confined within channel 74 as is the analogous edge portion of flange 62 within the analogous channel of rail 12.

Longitudinally spaced from each other along rail 10 and extending downwardly are a pair of T-shaped keys 80 each of which is adapted to locate rail 10 in mounting relationship to an aligned adaptor assembly 14. Each key 80 has a tapered end portion 82 which acts as a ramp after key 80 is inserted into key hole 84 in adaptor assembly 14 when key 80 is slideably moved into a locking position, i.e. into narrow portion 96 of key hole 84. Thus, a tight fit between rail 10 and adaptor assemblies 14 is facilitated. In addition, an aperture 81 is provided in rail 10 to cooperate with button 100 of adaptor assembly 14 to selectively lock rail 10 in position when key 80 is moved into locking position in key hole 84.

Adaptor assembly 14 is shown in FIGS. 4–7 and comprises a housing 86 which has wing portions 88 and 90 and to which cover member 91 is attached by threaded fastener 93. Wing portions 88 and 90 are attached to a horizontal surface of an associated vehicle such as floor 2 by threaded fasteners 92. Adaptor assembly 14 has a T-shaped key hole 84 with a portion 94 of sufficient size to receive key 80 and a smaller portion 96 of sufficient size to receive the neck portion 98 of key 80 while preventing upward movement of key 80 once slideably inserted therein. In addition, adaptor assembly 14 has a button 100 biased by spring 102 in an upward direction through aperture 104. Button 100 extends upwardly through aperture 81 in rail 10 and through an analogous aperture in rail 12 to selectively lock rails 10 and 12 in place on adaptor assemblies 14. Also button 100 of the adaptor 14 associated with rail 10 serves as a stop member when box 6 is slideably moved rearwardly by extending upwardly into aperture 64 when aligned therewith. Thus, button 100 acts as a stop means to prevent excessive rearward movement of box 6. Of course, one can override button 100 at any time by merely pressing downwardly on button 100 while simultaneously urging box 6 in either a forward or rearward direction. Similarly one can remove rail 10 from adaptor assembly 14, or rail 12 from the adaptor assembly 14 associated therewith, by pressing button 100 downwardly, simultaneously sliding rail 10 in an unlocking direction to move key 80 toward portion 94 of key hole 84 and then lifting rail 10 or 12 upwardly to effect detachment. It will be appreciated that adaptor assemblies 16 can be of identical construction to rearward adaptor assemblies 14 or can be provided without button 100, aperture 104 or spring 102 since the two buttons 100 of each adaptor assembly 14 are sufficient to provide locking means for channels 10 and 12 and stop means for box 6.

Further appreciation of the present invention will be obtained from the following description of installation and operation of a shopping bag holding container of the present invention. To install shopping bag container 1 in an automobile, two adaptor assemblies 14 and two adaptor assemblies 16 are fixedly secured by fasteners 92 to the floor of the vehicle in proper spaced relationship with respect to each other. Then rail 10 and rail 12 are each attached to a pair of longitudinally aligned adaptor assemblies 14 and 16 by placing keys 80 over apertures 84, pressing downwardly on each rail 10 and 12 until the lower surface of horizontal portion 68 of each rail is in abutting relationship to the top surfaces of the adaptor assemblies and then sliding each rail in a locking direction so that keys 80 slide into narrow portions 96 of slots 84 and buttons 100 of adaptor assemblies 14 extend upwardly through apertures 81 in the rails aligned therewith. Thus, each rail is locked in place onto an adaptor assembly 14, and also adaptor assembly 16 as longitudinal movement relative to adaptor assemby 16 is also prevented. Of course, rails 10 and 12 can later be detached by manually pressing down button 100 and sliding the rail in an unlocking direction.

Box 6 is slideably located between rails 10 and 12 by centering and then sliding flanges 60 and 62 longitudinally forwardly. Movement of aperture 64 past button 100 is easily effected by manually pressing downwardly on the button when it extends upwardly through the aperture. To place loaded grocery or shopping bags into receptacles 8 of box 6, one merely grasps handle 58 to pull box 6 rearwardly. Button 100 cooperates with aperture 64 to stop rearward movement to avoid unintentionally moving box 6 so far rearwardly that flanges 60 and 62 disengage from rails 10 and 12. Loaded grocery bags can be placed in receptacles 8 whereupon box 6 is manually pushed forwardly back into the vehicle interior for transportation of the grocery bags. The unloading process is carried out by simply reversing the above steps as is also the manner in which the container of the present invention can be detached from the vehicle. It will, of course, be apparent that adaptor assemblies 14 and 16 can be left attached to the vehicle without substantial interference with the vehicle's capacity for carrying other objects; while rails 10 and 12 and box 6 can be easily installed or detached from the vehicle as desired.

Now referring to FIGS. 8-15, several alternative embodiments of the present invention are shown. In FIGS. 8-10, a container, generally indicated by the numeral 101, is shown which employs a selectively rotatable box having a plurality of receptacles therein. FIGS. 11, 12 and 15 show alternative rail arrangements for a box 6 of the first embodiment shown in FIGS. 1-7. FIGS. 13 and 14 show an alternative embodiment of the present invention employing a modified rail and box structure.

Now referring to FIGS. 8-10, container 101 has a box 102 which is of generally cylindrical configuration with a plurality of receptacles 104 adapted to receive and provide lateral support for loaded grocery or shopping bags as in the previous embodiment. As shown in FIG. 8, receptacles 104 have four sides but are not of rectangular shape, having two arcuate walls reflecting the cylindrical outer shape of the rotary-type box 102. Box 102 is centrally, pivotally attached to a base plate 106 which has a stop means 108 for selectively preventing rotation of box 102 with respect to base plate 106.

Box 102 is of a double wall molded construction similar to that of the previous embodiment, but is molded to have a generally cylindrical shape rather than a generally rectangular shape as in the previous embodiment of the present invention. Thus, box 102 has an outwardly facing outer wall 110 joined at the top portion thereof to an axially inwardly facing outer wall 112. The bottom portion of wall 112 is integrally formed with bottom 114. The axially inner end of bottom 114 is integrally formed with outwardly facing inner wall 116, the top portion of which is joined to axially inwardly facing inner wall 118. Bottom 120 joins the bottom portions of wall 118 and is of generally circular configuration. Radially extending inner walls 105 cooperate with walls 112 and 116 and bottom 114 to define the plurality of receptacles 104. Inner walls 105 can also be of double wall construction with top portions joined by integral webs and bottom portions joined by bottom 114. As in the previous embodiment, it is contemplated that box 102 will be of molded thermoplastic integral construction and can have walls canted with respect to each other and to the vertical to facilitate the molding of box 102.

Centrally disposed in bottom 120 is an aperture through which pivot means 122 extends to pivotally attach box 102 to base 106. Circumferentially disposed about bottom 114 and projecting downwardly therefrom are a plurality of brackets 124 which carry rollers 125 to support bottom 114 on base plate 106 and facilitate rotational movement of box 102 with respect to base plate 106 and an associated vehicle.

Base plate 106 is of generally flat, plate-like construction and has a generally round portion 128 with a tongue portion 130 extending outwardly therefrom, preferably towards the rear of an associated vehicle when container 101 is attached thereto. Base plate 106 has an upwardly extending central embossment 126 which has a centrally disposed aperture adapted to receive pivot means 122 for pivotal attachment of box 102 to base plate 106. Base plate 106 also has a plurality of apertures 132 therein through which fastening means can extend to attach base plate 106 to the floor of an associated vehicle. Provided on tongue portion 130 of base plate 106 is stop means which is shown as a spring-loaded finger 108 biased in an upward direction which is adapted to cooperate with one of notches 109 in box 102 to selectively prevent rotational movement of box 102 with respect to base plate 106. Of course, finger 108 can be manually pressed downwardly out of notches 109 to allow rotation of box 102 so that the user can move any of receptacles 104 to the most rearward of otherwise most convenient location for loading or unloading grocery or shopping bags.

Now referring to FIGS. 11 and 12, another modified container of the present invention is shown and indicated generally by the numeral 201. Container 201 comprises a box 6 of the same construction of the previously disclosed embodiment shown in FIGS. 1-7. Container 201, however, employs modified rails for cooperation with flanges 60 and 62 of box 6. FIGS. 11 and 12 show one modified rail 206, it being appreciated that the other rail is of symmetrical construction. Modified rail 206 is longitudinally elongated and has a horizontal base 208 which is intended to be attached to the floor of an associated vehicle in a conventional manner by means of fasteners extending through apertures (not shown in the figure in base 208). Extending vertically upwardly from base 208 is vertical wall 210. Extending laterally inwardly from vertical wall 210 is the laterally inner portion 214 of base 208 and spaced vertically above portion 214 and in horizontal parallel relationship thereto is a laterally inwardly extending wall 212. Walls 212 and 214 cooperate with a portion 216 of vertical wall 210 to form a channel into which flange 60 of box 6 slideably extends.

FIGS. 13 and 14 show yet another alternative embodiment of the present invention, generally indicated by the numeral 301. Container 301 comprises a rectangular box 302 which is of a construction similar to that of box 6 but has no laterally extending flanges 60 or 62. Box 302 has a plurality of receptacles 303 for receiving and laterally supporting loaded grocery or shopping bags in a manner analogous to box 6 of FIGS. 1-7. Box 302 is intended in use to be supported directly upon the floor of an associated vehicle and between a pair of symmetrical, longitudinally extending angle irons 304, each having a horizontal wall 306 adapted to be attached to the floor of an associated vehicle by means of threaded fasteners extending through apertures therein (not shown in the figures) and a vertical wall 308 having a plurality of plastic plugs 310 attached thereto and projecting laterally inwardly therefrom. Angle irons 304 are, of course, placed in parallel spaced relationship a distance such that the sidewalls of box 302 are proximate to plugs 310, but box 302 is slideably located between angle irons 304. The use of plastic or other relatively soft materials for inwardly facing projections 310 minimizes the ware on box 302 attendant to sliding box 302 longitudinally in a forward or rearward direction relative to angle irons 304.

FIG. 15 shows another modified embodiment of the present invention, indicated generally by the numeral 401. Container 401 comprises a box 402 having a plurality of receptacles (not shown in the figure) as in the previously disclosed embodiment of FIGS. 1-7. Box 402 can be of the same construction as box 6 of FIGS. 1-7 or can have a modified flange 406 extending laterally outwardly without upturned laterally outer edge portions.

One end portion of leaf spring 409 is attached by means of rivets 412, or outer suitable fastening means, to one of the longitudinal side outer walls of box 402. Leaf spring 409 has a generally vertically extending portion 410 projecting upwardly from the laterally inner edge portion of leaf spring 409 which has apertures therein through which rivets 412 extend to fasten leaf spring 409 to box 402. Leaf spring 409 also has a generally horizontally disposed portion 408 which has a laterally outwardly extending tab 416 proximate to a downwardly extending flange 414 which can be formed as shown in the drawings by a reversely bent end portion of leaf spring 409. Flange 414 is located a distance from rivets 412 so as to have a resilient nature.

Container 401 has a pair of rails 404, one of which is adapted to cooperate with flange 406 and the other of which is adapted to cooperate with the flange (not shown in the figure) of box 402 extending laterally outwardly from the other side thereof. Rail 404 has a laterally inwardly facing channel portion 418 similar to the channel of rails 10 and 12 of the embodiment of FIGS. 1-7. Rail 404 is fixedly attached to the floor or an associated vehicle by means of a plurality of threaded fasteners 420 which extend through elongated apertures 422 in rail 404 and threadably engage aligned Riv-nuts 424 which are fixedly and permanently secured in apertures 426 in floor 410 of an associated vehicle. The forward end of rail 404 can have a wing-head thumb screw 428 extending through aperture 430 and threadably engaging Riv-nut 424 to not only secure the forward end portion of rail 404 to floor 410 of an associated vehicle but also to serve as a stop member preventing excessive forward movement of box 402. The rearward end portion of rail 404 has a notch 432 in the top wall of channel 418 which is adapted to cooperate with flange 414 of leaf spring 409 to provide a stop means preventing inadvertent excessive movement of box 402 in a rearward direction. Of course, to remove or detach box 402 from rails 404 or to move leaf spring 409 forwardly past notch 432, the stop means can be selectively manually overridden by merely lifting in an upward direction on tab 416 to lift flange 414 out of engagement with notch 428 so that box 402 can be slideably moved therepast. It will be appreciated that the stop means need be provided for only one rail 404. Therefore, only one leaf spring 409 is required for use in container 401 and only one rail 404 need have wing-head thumb screws 428 or notch 432.

It will be appreciated that the specific forms of the present invention disclosed herein before are well calculated to achieve the objects of the present invention. Thus, the various embodiments of the present invention are well adapted to support a plurality of loaded grocery or shopping bags in an upright position during transportation thereof in a vehicle while also providing ready access to each individual receptacle to one outside the vehicle by providing means for supporting the box having the plurality of receptacles between first and second positions. Thus, the box of the container of the present invention is moveable between positions for transportation and for loading and unloading of loaded shopping or grocery bags. In addition, the container of the present invention can be easily selectively attached or detached and removed from an associated vehicle. Still further, the containers disclosed herein can be easily and economically manufactured from modern materials as well as easily installed or detached from an associated vehicle. However, while specific forms of the specific invention have been disclosed and described herein, it is to be understood that the present invention may be varied within the scope of the appended claims without departing from the spirit thereof.

What is claimed is:

1. A container for holding shopping bags in an upright position for transportation in an associated vehicle comprising:

a box member having a plurality of open topped receptacles, each of said receptacles being adapted to receive and provide lateral support for a loaded grocery bag and having a generally rectangular parallelepiped outer shape with generally vertically oriented end walls and side walls; a flange extending horizontally from the bottom portion of each of said side walls;

means for movably supporting said box member between first and second positions along the horizontal surface of an associated vehicle, comprising a pair of longitudinally elongated, parallel rails, each having a channel along the laterally outer edge thereof facing toward and adapted to slideably receive a flange of one of said side walls, means disposed at said flange for controlling and limiting vertical and lateral movement of said flange within the channel; and spring biased adaptor means for removably fixedly securing said rails to said vehicle.

2. A container as recited in claim 1 comprising, in addition, stop means for limiting movement of said box member.

3. A container as recited in claim 1 wherein said box member is made of thermoplastic material and has generally vertical walls comprising proximate inner and outer wall members having top portions joined by an integral web portion, and bottom portions joined by an integral, horizontally disposed bottom wall, said inner and outer wall members being canted with respect to each other.

4. A container as recited in claim 1, wherein said spring biased adaptor means comprises adaptor assemblies and wherein each of said rails is removably attached to a plurality of adaptor assemblies, each of said adaptor assemblies being adapted to be fixedly attached to a horizontal surface of an associated vehicle.

5. A container as recited in claim 4 wherein each of said rails has a plurality of inverted T-shaped keys having a vertical portion projecting downwardly therefrom and a horizontal end portion, and each of said adaptor assemblies has an aperture in a top surface thereof adapted to receive one of said keys, each of said apertures having a relatively wide portion of sufficient size to vertically receive said horizontal portion of said key, and a narrow portion of a width of sufficient size to receive the vertical portion of said key but of a width less than said horizontal portion, each of said horizontal portions having a ramp portion adapted to engage a periphery of said narrow portion of said aperture.

6. A container as recited in claim 5 wherein at least one of said adaptor assemblies has a spring biased button adapted to project upwardly through an hole in the upper surface of said adaptor assembly and wherein at least one of said rails has a hole adapted to be aligned with said spring biased button when said T-shaped key member is located in said narrow portion of said aperture in said adaptor assembly.

7. A container as recited in claim 6 wherein each of said rails has a downwardly extending flange along the laterally inner edge portion thereof.

8. A container as recited in claim 7 wherein each of said flanges of said box member has an upturned edge portion along the laterally outer edge thereof.

9. A container as recited in claim 7 comprising, in addition, a stop member comprising an aperture located in one of said flanges of said box member and said button of said one of said adaptor assemblies, said button being spring biased to project upwardly through one of said rail members and into said aperture in one of said flanges when said aperture is aligned therewith.

* * * * *